United States Patent

Storr et al.

[11] 3,879,127
[45] Apr. 22, 1975

[54] METHOD OF SAMPLE PREPARATION FOR SAMPLE ANALYSIS

[75] Inventors: Kenneth Storr, Chertsey, England; Marcel Bonnafe, Vetraz-Monthoux, France

[73] Assignee: Technicon Instruments Corporation, Tarrytown, N.Y.

[22] Filed: July 12, 1972

[21] Appl. No.: 270,911

[30] Foreign Application Priority Data
July 13, 1971 United Kingdom............... 32733/71

[52] U.S. Cl.............................. 356/36; 210/31 C
[51] Int. Cl. ......................................... G01n 1/00
[58] Field of Search.......... 210/198 R, 198 C, 31 R, 210/31 C; 73/61.1 R, 61.1 C; 356/36, 38, 244, 246

[56] References Cited
UNITED STATES PATENTS
3,583,230  6/1971  Patterson ........................ 73/61.1 R
3,706,661  12/1972  Tangen et al. ................ 210/31 C X

*Primary Examiner*—Ronald L. Wibert
*Assistant Examiner*—F. L. Evans
*Attorney, Agent, or Firm*—S. P. Tedesco; Stephen E. Rockwell

[57] ABSTRACT

In the analysis of liquids, a whole liquid sample is absorbed onto an absorbent and porous sample carrier, such as a filter paper, and is then traversed by an eluting fluid to carry away one or more constituents of interest for analysis. Elution is preferably carried out under pressure. A sample holder comprises a simple plug and socketed body which are adapted to receive in clamping engagement therebetween a rigid plate of porous material, which acts as a support for a sample carrier.

3 Claims, 1 Drawing Figure

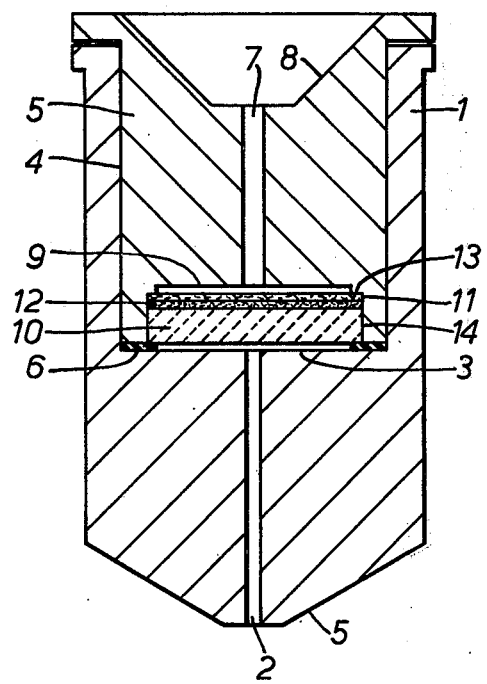

METHOD OF SAMPLE PREPARATION FOR SAMPLE ANALYSIS

This invention relates to a method and apparatus for sample analysis, and has particular reference to sample analysis by photometry, but will be seen to be applicable to many, if not all forms of sample analysis for determining the presence, quantity or quality of one or more given constituents of a sample material of which constituents of no interest can either be fixed or will not influence the analysis of the constituents of interest. It is of particular value when the amount of sample available is very small but is of course not limited to such cases.

As an example, various clinical tests involve sampling blood to determine the presence, absence, or quantity present of certain amino-acids in order to rule out or confirm the possibility of certain diseases or metabolic disorders in a patient. Such analysis can be of great value, for example, in screening blood from new born children or from donors to blood banks.

In some cases, the speed with which such analysis can be effected is crucial to the well being of a patient and the method and apparatus of the present invention, as exemplified in the specific embodiments described below, have been shown by laboratory tests to make significant savings in time possible.

The invention is, however, applicable to analysis of a wide variety of liquid samples.

In accordance with a feature of the invention, there is provided a method of analysis of liquids, including the preparatory steps of applying a whole liquid sample to a porous and absorbent carrier, of sheet form, and passing an eluting fluid through the sample and carrier to remove one or more constituents of interest for analysis.

The sample and carrier may, if desired, be treated prior to elution to fix or retain certain constituents of the sample. Conversely, constituents may be released from corpuscular or solid material by such pre-treatment.

The invention also includes a hollow body having a through passage, a plug insert having a through passage and insertable in the body for sealing engagement therein, and a rigid plate of porous material located in the hollow body and disposed transversely thereof to prevent communication between the said passages except through the pores of the rigid material.

The sample holder is primarily intended for use under internal pressure, the plug insert and body being sealingly engaged by respective inlet and outlet means for the introduction and extraction of eluting fluid, the inlet and outlet means further being urged towards each other to apply mechanical clamping pressure between the body and the plug.

The holder may, for example, be adapted for use in the sampling apparatus described in British Specification No. 1,232,751.

One form of sample holder in accordance with the invention is described below, by way of example, with reference to the accompanying drawing, which shows the holder in axial cross-section.

The holder comprises a hollow body 1 of circular cross-section having a counter-bore 4 terminating at a shoulder 3 and having an axial throughbore 2 commencing at shoulder 3 and terminating at a male frustro-concial surface 15 at the lower end of the body. A plug insert 5 is insertable through the upper end of counterbore 4, into fluid and pressure tight sealing engagement with a sealing ring 6. The plug has an axial through-bore 7 opening at its upper end to a female frustro-conical surface 8 and at its lower end to a shallow counterbore 9, which terminates at a shoulder 13 and a further, larger counterbore 14.

The counterbore 14 forms a chamber for reception of a sample and filter assembly comprising a rigid plate 10 of coarse filter material, for example stainless steel sinter, supporting a disc 11 of filter paper acting as a porous and absorbent sample carrier and a further disc of ultra fine filter material 12. The components 10, 11, 12 are thus disposed transversely of the body and insert to prevent communication between the passages formed by bores 2 and 7 except through the pores of the components.

In use, the assembled sample holder is inserted between eluting fluid inlet and outlet means which make sealing engagement at the frustro-conical surfaces, and are moved together to apply an axially directed mechanical clamping force to the parts, so that the plug clamps the sample assembly against the sealing ring 6 and the sealing ring 6 against the shoulder 3. Eluting fluid is passed through the bore 7 to the upper side of the sample and filter assembly through the assembly and through the outlet passage 2 to the eluting fluid outlet, which may, for example, lead directly to a chromatography column.

In preparing a sample for use in the above described manner, a very small liquid sample, say of whole blood, can be dropped onto a piece of filter paper to form a circular spot of some 9 mm. diameter. The paper and sample absorbed thereby can then be autoclaved to fix certain constituents, such as cells and proteins. A small disc can be punched from the centre of the above circular spot and placed on the above-mentioned filter discs 10 and 12 and inserted in the sample holder without further treatment. Unfixed constituents, such as amino-acids, may thus be eluted out for chromatographic analysis.

The above described technique thus obviates the usual steps of removing unwanted constituents from the sample prior to analysis, with consequential and substantial savings in time. Initial collection of the sample on ordinary filter paper is, of course, extremely convenient and eluting under pressure of the absorbed sample is permitted by the use of the solid filter plate, which acts as a support for the filter paper and the ultra fine filter material.

The ultra-fine filter material may, for example, have a pore size allowing the passage only of particles of 2 microns or less in size, whereas the rigid filter plate will pass particles of, say 10 to 20 microns. Stainless steel sinter is a suitable material for plate 10 for many purposes, but other materials could of course be employed for different cases.

By the method and apparatus described above, it has been possible to carry out analysis of whole blood for constituents of interest in half an hour, whereas the best presently available equipment of which we are aware requires two hours for a comparable analysis.

Another example of the utility of the invention is the analysis of, say, a single drop of water. If an analysis of a dissolved impurity is required, solid material and suspended matter which may interfere may be retained on the sample holding device so as not to interfere with the subsequent analysis. Conversely, components in the solid matter retained may, by suitable pre-treatments, be selectively eluted for analysis.

In the foregoing specification and in the appended claims, by whole liquid sample is meant a sample containing a plurality of constituents that may be greater in number than the one or more of interest for analysis.

Also, it should be noted that fibrous materials other than filter paper may be used as the sample carrier.

What is claimed is:

1. A method of analysis of liquids, including the preparatory steps of applying a whole blood sample to a sample carrier of absorbent and porous sheet material, treating the sample when absorbed by said carrier to fix a particular constituent of the sample, then traversing said carrier with an eluting fluid to remove a selected unfixed constituent of interest from said carrier for analysis, and passing said eluting fluid containing said selected constituent through a chromatography column for analysis.

2. A method as claimed in claim 1, comprising the step of applying differential pressure to facilitate traversing by said eluting fluid.

3. A method as in claim 1 wherein the treating of the sample includes the step of autoclaving the liquid sample as applied to said carrier, to fix said particular constituent.

* * * * *